United States Patent [19]
Uchiumi

[11] Patent Number: 5,917,793
[45] Date of Patent: Jun. 29, 1999

[54] DIGITAL INFORMATION RECORDING APPARATUS

[75] Inventor: Satoshi Uchiumi, Tokorozawa, Japan

[73] Assignee: Pioneer Electronic Corporation, Tokyo-To, Japan

[21] Appl. No.: 08/916,326

[22] Filed: Aug. 22, 1997

[30] Foreign Application Priority Data

Aug. 22, 1996 [JP] Japan .............................. P08-221588
[51] Int. Cl.$^6$ ..................................................... G11B 7/00
[52] U.S. Cl. ................................ 369/59; 369/48; 369/60
[58] Field of Search .................................. 369/59, 47, 48, 369/49, 50, 54, 58, 60, 116, 124

[56] References Cited

U.S. PATENT DOCUMENTS 5,818,805  10/1998  Kobayashi et al. ........................ 369/59

*Primary Examiner*—Muhammad N. Edun
*Attorney, Agent, or Firm*—Morgan, Lewis & Bockius LLP

[57] ABSTRACT

A digital information recording apparatus (S) has a power control circuit 11 provided with: a wave form recognizing device (31) for recognizing a type of a pulse wave form of digital information; a conversion ratio memory device (32) for storing a plurality of wave form conversion ratios, which are set in advance for each of standard clocks of the digital information and which correspond to a plurality of types of pulse wave forms of the digital information, and outputting one of the stored wave form conversion ratios which corresponds to the recognized type of the pulse wave form; a voltage converting device (34, 35) for converting the outputted wave form conversion ratio to an analog voltage value; a generating device (42, 43) for generating a saw-toothed signal which has a saw-toothed wave form for each of the standard clocks; a comparing device (44, 45) for comparing the converted analog voltage value with a value of the saw-toothed wave form of the generated saw-toothed signal, and outputting a digital comparison signal; and a calculating device (46, 47) for calculating a logical product of the outputted digital comparison signal and the digital information for each of the standard clocks, and outputting a logical product signal indicating the calculated logical product. The apparatus also has a recording device (12, 2) for recording the outputted logical product signal onto an information record medium (1).

6 Claims, 9 Drawing Sheets

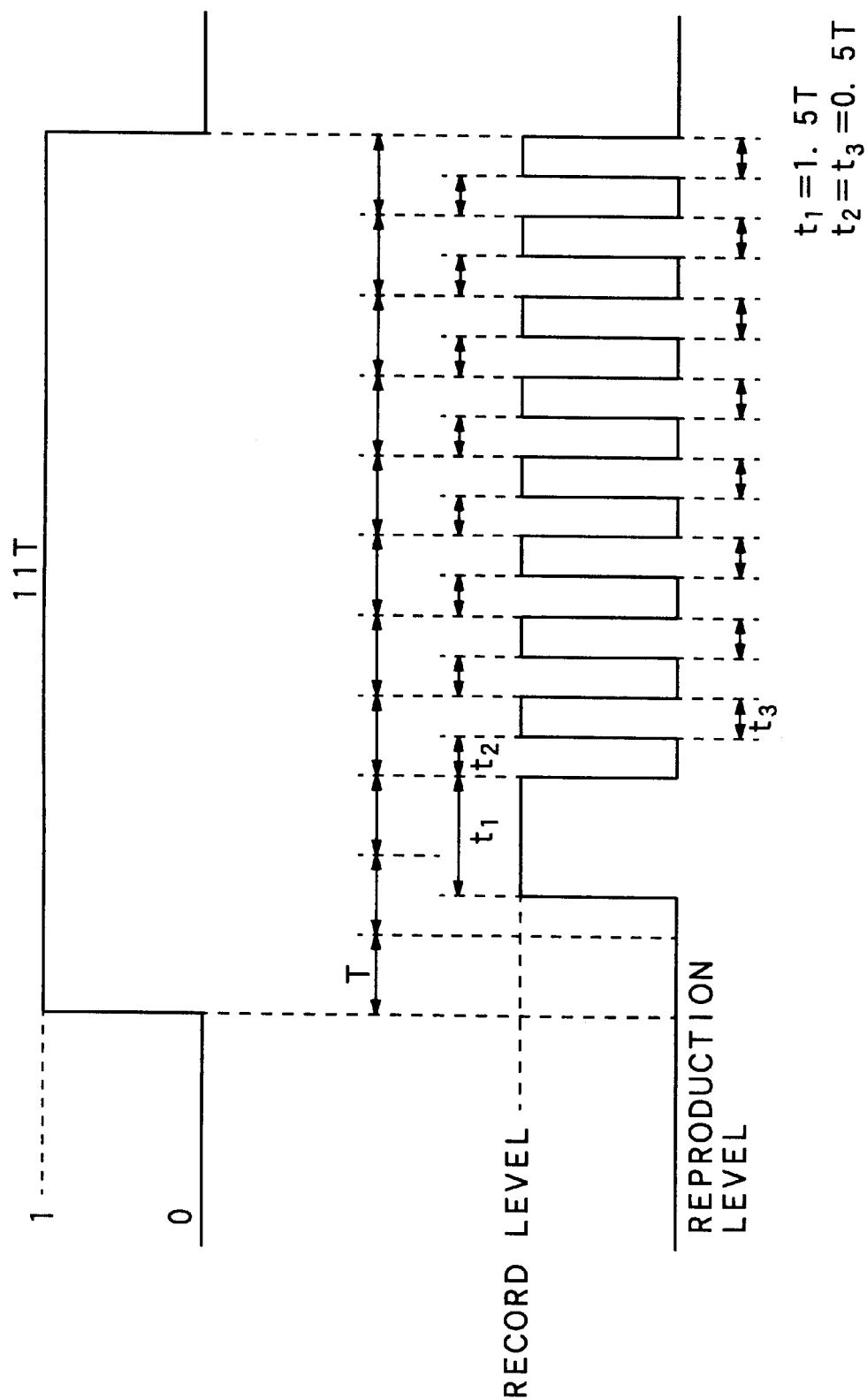

DIGITAL INFORMATION RECORDING APPARATUS

BACKGROUND OF THE INVENTION

1. Field of the Invention

The present invention is related with a digital information recording apparatus for recording digital information onto an information record medium, such as a DVD-R (DVD-Recordable) which record density is about 7 times as high as that of the conventional CD-R (Compact Disc-Recordable).

2. Description of the Related Art

There is a so-called DVD as an information record medium which record density is about 7 times as high as that of the conventional CD. As one type of the DVD, there is a DVD-R of write-once-read-many type, on which the information can be written only once.

In this DVD-R, a pigment film is used for a record layer to record the information. The recording operation is performed as following. Namely, a record laser light is irradiated onto a small area portion (i.e., a portion which is to be a record pit described later) on a record track (i.e., a groove (a guide groove) or a land) which is formed in advance on the pigment film. The record laser light is focused to fit with this small area portion, and is modulated in correspondence with the digital information to be recorded. Thus, this small area portion is heated by the heat energy converted from the irradiated record laser light, so that the property such as a reflection coefficient or the like of the pigment film at this small area portion is changed to form the record pit as the property changed portion of the pigment film. In this manner, the recording operation is performed. Further, at the time of reproducing the digital information, the digital information is read out by the difference in the property such as the reflection coefficient or the like with respect to the reproduction laser light between the record pit and the portion of the pigment film, which has never been irradiated with the record laser light. At this time, in order to secure the above described large storage capacity as the DVD-R, the size of the record pit to be formed is required such that the length in the radial direction of the DVD-R (i.e. the width of the record pit) is about 0.4 µm, the length in the circumferential direction of the DVD-R (i.e., the length of the record pit) is about 0.4 µm for the shortest record pit and about 1.9 µm for the longest record pit.

By the way, in the conventional CD-R, in case that the pigment film is used for the record layer, there is a problem that the reproduction wave form is distorted when the record pit is reproduced after the record pit is formed by the record laser light modulated by the digital information to be recorded. One of the causes for this distortion is that the shape of the record pit is not symmetrical with respect to the circumferential direction of the CD-R but is distorted in a tear drop shape, in which the record pit is thin at the front end portion thereof and is thicker at the back end portion thereof, with respect to the circumferential direction of the CD-R. Namely, as shown in FIG. 7, in case of recording the information by use of the modulation wave form of the record laser light (as shown in the top stage of FIG. 7), the attainable temperature at a position irradiated by the record laser light on the pigment film becomes low at the front end portion of the record pit and becomes high at the back end portion of the record pit (as shown in the middle stage of FIG. 7) by the heat accumulation phenomena, so that the record pit distorted in the tear drop shape is formed (as shown in the bottom stage of FIG. 7).

Another of the causes for the distortion of the record pit shape is that the light spot formed at the irradiation position of the record laser light is spewed from an area where the record pit is intended to be formed. Namely, at the time of irradiating the end portion of the area where the record pit is to be formed, the light spot is spewed out to the portion other than the area where the record pit is to be formed. As a result, the record pit is formed, which is poor in the symmetry with respect to the digital information to be recorded between the front end portion and the back end portion of the record pit.

In order to solve these problems, according to the conventional technology, the record laser light is not simply modulated by the modulation signal, in which the pulse signal is modulated by the digital information to be recorded as shown in the top stage of FIG. 7, but the wave form conversion is further applied to the wave form after the modulation by use of the digital information to be recorded, so that the record signal corresponding to the digital information to be recorded is obtained. Then, the record laser light is modulated by use of this record signal after the wave form conversion, so as to form the record pit.

That is to say, as shown in FIG. 8, the modulation signal (as shown in the top stage of FIG. 8), which is modulated by the digital information to be recorded is further wave-form-converted, so that a first portion of the wave form corresponding to the back end portion of the record pit is erased for a predetermined interval, and that a next portion of the wave form corresponding to the front half portion of the record pit is constructed by the continuous short pulse waves to form the record signal (as shown in the bottom stage of FIG. 8). In the example shown in FIG. 8, as for the signal having a length of 11 T (T is a length corresponding to one standard clock of the digital information to be recorded, and it is standardized that the digital information to be recorded on the DVD-R is constructed by a combination of 9 kinds of data pulses i.e., from a pulse having a length of 3 T to a pulse having a length of 11 T, and a synchronization pulse having a length of 14 T), the first portion is erased by an amount of 1.5 T, and the latter half portion is wave-form-converted such that the pulses each having a length of 0.5 T are continuous, so that the record signal as shown in the bottom stage of FIG. 8 is generated. Then, the record laser light is modulated by use of the record signal generated in this manner and is irradiated onto the pigment film. By modulating the record laser light by the wave-form-converted record signal in this manner, the temperature change in the pigment film is not as shown in the middle stage of FIG. 8, but it is possible to form the record pit in an oval shape better in the symmetry corresponding to the digital information to be recorded.

Here, in order to wave-form-convert the modulation signal shown in the top stage of FIG. 8 to the record signal shown in the bottom stage of FIG. 8, a wave form conversion circuit equipped with at least a delay circuit is required. Namely, it is possible to erase the first portion of the modulation signal by an amount of 1.5 T for example, by calculating a logical product of a delay signal, which is generated by delaying the modulation signal by a delay circuit by an amount of 1.5 T, and an original wave form.

Further, it is possible to convert the latter half portion of the modulation signal to the wave form, in which the short pulses are continuously arranged in time sequence as shown in FIG. 8, by operating a flip-flop circuit by use of a standard clock as a trigger on the basis of the modulation signal, and calculating the logical product of the output of the flip-flop circuit and a delayed clock signal, which is obtained by delaying the standard clock for a predetermined delay time period.

In this manner, the delay circuit is required in either case.

By the way, as this kind of delay circuit, there are an analog type delay circuit using a delay line, and a digital type delay circuit. Among them, the former may be constructed by a lumped parameter element, a distributed parameter element, an active element such as a logical gate, and so on. The latter may be constructed by shift registers in predetermined stages (=predetermined delay time period/cycle of standard clock), a counter for counting a predetermined number of standard clocks, and so on. Desirable one of these methods is determined mainly in consideration with various factors such as the required delay time period, the required accuracy, the possibility of realization, and so on. Further, as the occasion demand, a delay line may be utilized which can make the delay time period variable.

On the other hand, in case of the conventional CD-R, the standard clock cycle is about 230 nsec (nanoseconds), so that about an accuracy of 10 nsec is necessary and enough as an accuracy for the above mentioned wave-form-conversion from the modulation signal to the record signal. Thus, it is possible to construct the wave-form-conversion circuit by use of the conventional delay line without any difficulty.

However, in case of the DVD-R, the standard clock cycle is about 38 nsec so as to realize the large storage capacity, and a very high accuracy for the above mentioned wave-form-conversion is required. More concretely, a resolution and a repeatability in the accuracy of about a few nsec (e.g., 1 nsec if possible) is required. Further, it is also required to enable changes in the various settings (e.g., the change in the wave form to be converted) with such a high accuracy.

However, the delay line available as the conventional delay circuit has the resolution of about 5 nsec. And that, it is necessary, in case of the delay line, to consider the accuracy error with respect to the total delay time period and the change in the delay time period during the actual usage in the range of about ±10%. Furthermore, in consideration with the dispersion in the delay time periods between the delay lines connecting the respective elements, the substantial accuracy is even more degraded, which is a problem in this case.

On the other hand, in case of the digital type delay circuit, it is necessary to use the clock signal having the cycle of about 1 GHz in order to achieve the resolution of about 1 nsec. However, the cycle of the clock signal available in the general CMOS (Complementary Metal-Oxide-Semiconductor) logical circuit except for a very high speed logical element such as a so-called ECL (Emitter Coupled Logic) circuit or the like, is limited to be as much as 100 MHz. As a result, the attainable resolution is about 10 nsec, which is a problem in this case of the digital type delay circuit.

Further, in the construction in which the delay time period is variable, it is necessary to connect a large number of special delay lines of high resolution type in concatenation. Thus, the resolution as a whole is certainly degraded due to the dispersion of the respective delay lines, which is a problem in this case.

Furthermore, if utilizing the above mentioned ECL circuit or the delay lines of high resolution type in order to realize the delay circuit having the high resolution, the structure of the circuit becomes complicated and the power consumption is increased. And that, the hardware circuit itself would be quite expensive.

SUMMARY OF THE INVENTION

The present invention is proposed from the viewpoint of the above mentioned problems. It is therefore an object of the present invention to provide a digital information recording apparatus, which can record digital information precisely while maintaining a resolution, an accuracy and a repeatability at levels suitable for the DVD-R, and can be realized by use of presently available elements which are relatively economical and simple in the structure.

The above object of the present invention can be achieved by a digital information recording apparatus provided with: a wave form recognizing device for recognizing a type of a pulse wave form of digital information, which is to be recorded onto an information record medium; a conversion ratio memory device for storing a plurality of wave form conversion ratios, which are set in advance for each of standard clocks of the digital information and which correspond to a plurality of types of pulse wave forms of the digital information, and outputting one of the stored wave form conversion ratios which corresponds to the recognized type of the pulse wave form; a voltage converting device for converting the outputted wave form conversion ratio to an analog voltage value; a generating device for generating a saw-toothed signal which has a saw-toothed wave form for each of the standard clocks; a comparing device for comparing the converted analog voltage value with a value of the saw-toothed wave form of the generated saw-toothed signal, and outputting a digital comparison signal, which value is one of "1" and "0" when the value of the saw-toothed wave form is larger than the converted analog voltage value and which value is the other of "1" and "0" when the value of the saw-toothed wave form is not larger than the converted analog voltage value; a calculating device for calculating a logical product of the outputted digital comparison signal and the digital information for each of the standard clocks, and outputting a logical product signal indicating the calculated logical product; and a recording device for recording the outputted logical product signal as a record signal corresponding to the digital information onto the information record medium.

According to the digital information recording apparatus of the present invention, the type of the pulse wave form of digital information, which is to be recorded onto the information record medium, is recognized by the wave form recognizing device, such as an input analyzer or the like. Then, one of the stored wave form conversion ratios, which corresponds to the recognized type of the pulse wave form, is outputted by the conversion ratio memory device, such as a register or the like, for storing a plurality of wave form conversion ratios, which are set in advance for each of standard clocks of the digital information and which correspond to a plurality of types of pulse wave forms of the digital information. Then, the outputted wave form conversion ratio is converted to the analog voltage value by the voltage converting device. On the other hand, the saw-toothed signal which has the saw-toothed wave form for each of the standard clocks is generated by the generating device. Then, the converted analog voltage value is compared with the value of the saw-toothed wave form of the generated saw-toothed signal, by the comparing device. Here, when the value of the saw-toothed wave form is larger than the converted analog voltage value, the digital comparison signal which value is one of "1" and "0" (e.g. the value "1") is outputted by the comparing device. Alternatively, when the value of the saw-toothed wave form is not larger than the converted analog voltage value, the digital comparison signal which value is the other of "1" and "0" (e.g. the value "0") is outputted by the comparing device. Then, the logical product of the outputted digital comparison signal and the digital information for each of the standard clocks is calculated by the calculating device, such as an AND gate or the like. Then, the logical product signal indicating the calculated logical product is outputted by the calculating device. Finally, the logical product signal outputted in this manner is recorded as a record signal corresponding to the digital information onto the information record medium by the recording device, such as an optical pick-up or the like.

Thus, it is possible to convert the pulse wave form of the digital information finely for each standard clock, by finely separating or classifying the analog voltage value into many voltage values in correspondence with the wave form conversion ratio, so that the digital information can be converted to the record signal with a high accuracy and a high repeatability to be recorded onto the information record medium.

Therefore, it is possible to economically and easily produce the digital information recording apparatus, which is capable of converting the digital information accurately to the record signal and recording it onto the information record medium, by employing the existing inexpensive elements without employing a very high speed and high accuracy element such as an ECL circuit or the like.

In one aspect of the digital information recording apparatus of the present invention, the apparatus is further provided with a scale correcting device for correcting at least one of the converted analog voltage value and the value of the saw-toothed wave form so as to make a maximum value of the converted analog voltage value and a maximum value of the saw-toothed wave form coincident to each other. And that, the comparing device comparing the converted analog voltage value with the value of the saw-toothed wave form in a condition where the maximum value of the converted analog voltage value and the maximum value of the saw-toothed wave form are coincident to each other.

According to this aspect, at least one of the converted analog voltage value and the value of the saw-toothed wave form is corrected by the scale correcting device, so that the maximum value of the converted analog voltage value and the maximum value of the saw-toothed wave form are made coincident to each other. Then, the converted analog voltage value is compared with the value of the saw-toothed wave form by the comparing device in the condition where the maximum value of the converted analog voltage value and the maximum value of the saw-toothed wave form are coincident to each other.

Thus, since the comparison is performed by the comparing device while the full scale (e.g. the dynamic range) of the analog voltage value and the full scale (e.g. the dynamic range) of the saw-toothed wave form are coincident to each other, the accurate digital comparison signal, which corresponds to the wave form conversion ratio very precisely, can be outputted by the comparing device.

Therefore, even more accurate and precise recording operation of the digital information can be performed by the digital information recording apparatus of the present invention.

In this aspect, the scale correcting device may correct at least one of the converted analog voltage value and the value of the saw-toothed wave form during a space time duration in which space information corresponding to "0" of the digital information is inputted to the digital information recording apparatus. And that, the scale correcting device may control the calculating device to stop outputting the logical product signal while the scale correcting device is correcting during the space time duration.

In this case, at least one of the converted analog voltage value and the value of the saw-toothed wave form is corrected during the space time duration by the scale correcting device. Then, under the control of the scale correcting device, the calculating device stops outputting the logical product signal while the scale correcting device is correcting during the space time duration.

Thus, it is possible to prevent the wave form due to the correction from harmfully influencing the record signal while performing the correction.

In another aspect of the digital information recording apparatus of the present invention, the voltage converting device converts the wave form conversion ratio corresponding to an odd standard clock among the standard clocks and the wave form conversion ratio corresponding to an even standard clock among the standard clocks separately from each other to an odd analog voltage value and an even analog voltage value respectively. The generating device generates an odd saw-toothed signal which has an odd saw-toothed wave form for the odd standard clock and an even saw-toothed signal which has an even saw-toothed wave form for the even standard clock separately from each other. The comparing device compares the converted odd analog voltage value with a value of the odd saw-toothed wave form, outputs an odd digital comparison signal as one portion of the digital comparison signal corresponding to the odd standard clock, compares the converted even analog voltage value with a value of the even saw-toothed wave form, and outputs an even digital comparison signal as another portion of the digital comparison signal corresponding to the even standard clock. The calculating device calculates an odd logical product of the outputted odd digital comparison signal and the digital information corresponding to the odd standard clock, outputs an odd logical product signal indicating the calculated odd logical product, calculates an even logical product of the outputted even digital comparison signal and the digital information corresponding to the even standard clock, and outputs an even logical product signal indicating the calculated even logical product. And that, the recording device generates a logical sum signal corresponding to a logical sum of the outputted odd logical product signal and the outputted even logical product signal, and records the generated logical sum signal as the record signal onto the information record medium.

According to this aspect, on one hand, the wave form conversion ratio corresponding to the odd standard clock is converted to the odd analog voltage value by the voltage converting device. On the other hand, the wave form conversion ratio corresponding to the even standard clock is converted to the even analog voltage value by the voltage converting device. Then, on one hand, the odd saw-toothed signal having the odd saw-toothed wave form is generated by the generating device. On the other hand, the even saw-toothed signal having the even saw-toothed wave form is generated by the generating device. Then, on one hand, the converted odd analog voltage value is compared with the value of the odd saw-toothed wave form, and the odd digital comparison signal is outputted by the comparing device. On the other hand, the converted even analog voltage value is compared with the value of the even saw-toothed wave form, and the even digital comparison signal is outputted by the comparing device. Then, on one hand, the odd logical product is calculated and the odd logical product signal is outputted by the calculating device. On the other hand, the even logical product is calculated, and the even logical product signal is outputted by the calculating device. Finally, the logical sum signal corresponding to the logical sum of the odd logical product signal and the even logical product signal is generated and is recorded onto the information record medium by the recording device.

Thus, since the conversion from the digital information to the record signal is performed such that the digital information is separated once every two standard clocks, it is possible to secure the rising up time of the saw-toothed signal or the like with an enough margin, and it is possible to secure the conversion time for converting the wave form conversion ratio to the analog voltage value, so that the conversion to the record signal can be performed more accurately.

In another aspect of the digital information recording apparatus of the present invention, when mark information corresponding to "1" of the digital information is inputted to the digital information recording apparatus, the conversion ratio memory device outputs the wave form conversion ratio so that a pulse in the record signal is not outputted during a first time duration corresponding to a first standard clock in the mark information, outputs the wave form conversion ratio so that a pulse in the record signal is outputted during a half of a second time duration corresponding to a second standard clock in the mark information, and outputs the wave form conversion ratio so that a pulse in the record signal is continuously outputted during a third time duration corresponding to a third standard clock in the mark information.

According to this aspect, when the mark information is inputted to the digital information recording apparatus, the wave form conversion ratio is outputted by the conversion ratio memory device, so that a pulse in the record signal is not outputted during the first time duration, a pulse in the record signal is outputted during a half of the second time duration, and a pulse in the record signal is continuously outputted during the third time duration.

Thus, no pulse exists in the record signal during the time duration corresponding to the first 1.5 standard clocks in the mark information. Accordingly, the aforementioned asymmetry in the temperature distribution along the record track due to the heat accumulation phenomena is at least partially or mostly compensated by this special arrangement of the pulses in the record signal, so that the symmetry of the record pit on the information record medium can be certainly improved.

Therefore, it is possible to form the record pits having the accurate and precise shapes in correspondence with the digital information on the information record medium.

In another aspect of the digital information recording apparatus of the present invention, the voltage converting device has an 8 bits digital-to-analog converter.

According to this aspect, since the voltage converting device has the 8 bits digital-to-analog converter, it is possible to set 256 analog voltage values for one standard clock, so that it is possible to perform the conversion to the record signal with a high accuracy and a high resolution in a practical sense.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 8 is a timing chart showing a relationship between a modulation signal (at a top stage) and a record signal (at a bottom stage);

DETAILED DESCRIPTION OF THE PREFERRED EMBODIMENT

Next, a preferred embodiment of the present invention will be explained with reference to the accompanied drawings. In the following explanations, the present invention is applied to a digital information recording apparatus for recording digital information, which is transmitted from a host computer, onto a DVD-R as an embodiment of the present invention.

(I) Digital Information Recording Apparatus

First of all, a whole construction and a whole operation of a digital information recording apparatus as an embodiment of the present invention is explained with reference to FIG. 1. Here, the following assumptions are made in the embodiment described below. Namely, pre-pits or the like carrying address information on the DVD-R 1 are formed in advance on the information tracks, on which the digital information is to be recorded, of the DVD-R 1. Then, at the time of recording the digital information, the address information on the DVD-R 1 is obtained by detecting the pre-pits. By this, a record position on the DVD-R 1 where the digital information is to be recorded is detected, so that the digital information is recorded thereto.

Figure 1:
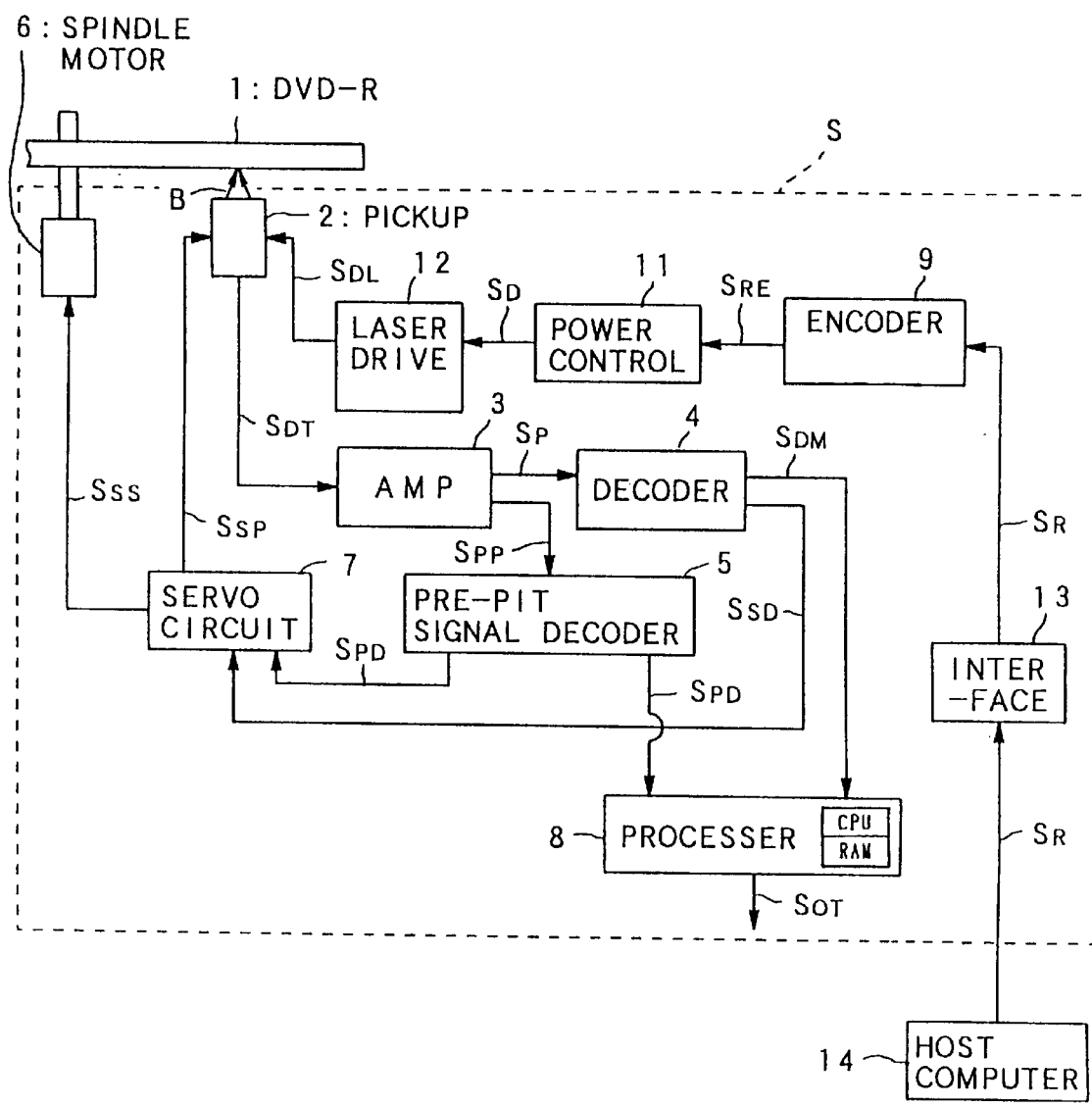
FIG. 1 is a block diagram showing a schematic configuration of a digital information recording apparatus as an embodiment of the present invention.

As shown in FIG. 1, a digital information recording apparatus S of the embodiment is provided with: an optical pick-up 2; a reproduction amplifier (AMP) 3; a decoder 4; a pre-pit signal decoder 5; a spindle motor 6; a servo circuit 7; a processor (CPU) 8; an encoder 9; a power control circuit 11 equipped with a wave fore converting circuit as described later in detail; a laser drive circuit 12; and an interface 13. To the digital information recording apparatus S, a digital information signal $S_R$ indicating digital information to be recorded is inputted through the interface 13 from an external host computer 14.

Next, a whole operation is explained.

The pick-up 2 includes a laser diode, a deflection beam splitter, an objective lens, light detectors and the like (not shown), and irradiates a light beam B onto the information record surface of the DVD-R 1 on the basis of a laser drive signal $S_{DL}$, and detects the pre-pits on the basis of a reflected light thereof to thereby record the digital information to be recorded. Moreover, in a case of the existence of old digital information which has been already recorded, the pick-up 2 detects this old digital information on the basis of the reflected light of the light beam B.

Then, the reproduction amplifier 3 amplifies a detection signal $S_{DT}$ including the information corresponding to the pre-pits (and the information corresponding to the old digital information which has already been recorded, if it exists) outputted by the pick-up 2, and outputs a pre-pit signal $S_{PP}$ corresponding to the pre-pits (and an amplified signal $S_P$ corresponding to the old digital information if it exists).

After that, the decoder 4 applies the 8–16-demodulation and the de-interleave to the amplified signal $S_P$ to thereby decode the amplified signal $S_P$ and then outputs a demodulated signal $S_{DM}$ and a servo demodulated signal $S_{SD}$.

On the other hand, the pre-pit signal decoder 5 decodes the pre-pit signal $S_{PP}$ to thereby output a demodulated pre-pit signal $S_{PD}$.

Then, the servo circuit 7 outputs to the pick-up 2 a pick-up servo control signal $S_{SP}$ for focus servo control and tracking servo control in the pick-up 2, on the basis of the demodulated pre-pit signal $S_{PD}$ and the servo demodulated signal $S_{SD}$, and also outputs to the spindle motor 6 a spindle servo signal $S_{SS}$ for servo-controlling the rotation of the spindle motor 6 to rotate the DVD-R 1.

Along with this, the processor 8 outputs to the external a reproduction signal $S_{OT}$ corresponding to the old digital information, which has been already recorded, on the basis of the demodulated signal $S_{DM}$, and mainly controls the digital information recording apparatus S as a whole.

On the other hand, the interface 13 performs an interface operation with respect to the digital information signal $S_R$ transmitted from the host computer 14 so as to read it into the digital information recording apparatus S under the control of the processor 8, and outputs the digital information signal $S_R$ to the encoder 9.

The encoder 9, which includes an ECC (Error Correction Code) generator, an 8–16 modulator, a scrambler and the like (not shown in the figure), constitutes an ECC block, which is a unit to perform the error correction at the time of reproduction, and applies the interleave process, the 8–16 modulation process and the scramble process to this ECC block to thereby output a modulation signal $S_{RE}$.

Then, the power control circuit 11 outputs to the laser drive circuit 12 a record signal $S_D$ (i.e. a drive signal to drive the laser drive circuit 12) to control an output of the laser diode (not shown) within the pick-up 2 on the basis of the modulation signal $S_{RE}$.

After that, the laser drive circuit 12 outputs to the laser diode the laser drive signal $S_{DL}$ for actually driving the laser diode to emit the light beam B on the basis of the record signal $S_D$.

Further, the digital information recording apparatus S may reproduce the information recorded on the DVD-R 1. In that case, the reproduction signal $S_{OT}$ is outputted to the external through the processor 8 on the basis of the demodulated signal $S_{DM}$.

(II) Power Control Circuit

Next, the internal construction and the operation of the power control circuit 11 is explained in detail with reference to FIG. 2.

Figure 2:
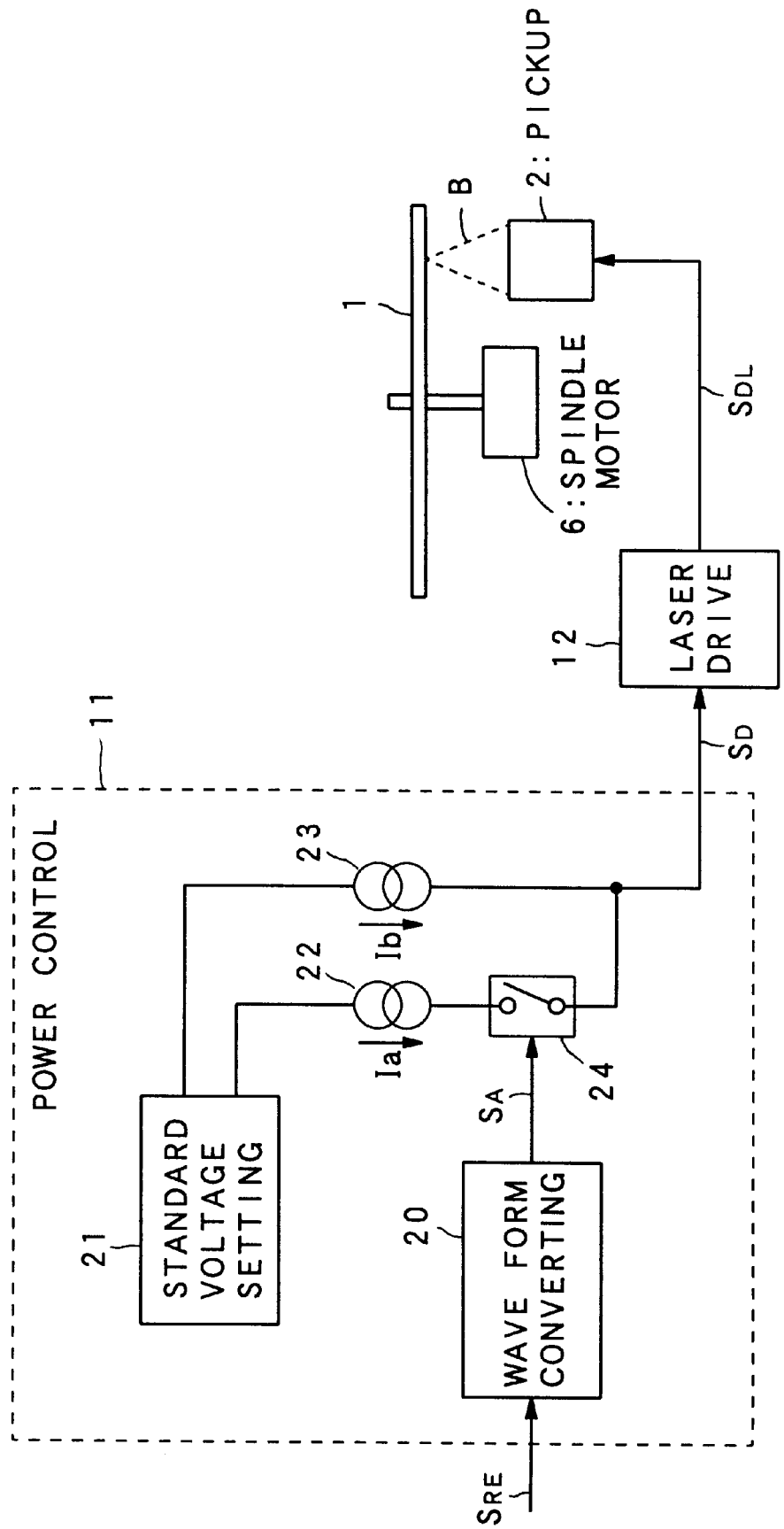
FIG. 2 is a block diagram showing a schematic configuration of a power control circuit etc. in the embodiment.

In FIG. 2, the power control circuit 11 is provided with: a wave form converting circuit 20; a standard voltage setting circuit 21; a constant electric current sources 22 and 23; and a switch 24.

The operation is explained next.

The standard voltage setting circuit 21 generates a standard voltage corresponding to the record level and a standard voltage corresponding to the reproduction level of the record signal $S_D$ (refer to the bottom stage of FIG. 8), and drives the constant electric current sources 22 and 23 for outputting the constant electric currents Ia and Ib corresponding to the respective levels. At this time, the constant electric current Ib is a constant current corresponding to the value for generating the voltage of the reproduction level of the record signal $S_D$. The constant electric current Ia is a constant current corresponding to the value for generating the voltage of the record level of the record signal $S_D$ by superimposing the constant electric current Ia onto the constant electric current Ib under the control of the switch 24. Therefore, when the voltage at the record level of the record signal $S_D$ is generated, the electric current value of the record signal $S_D$ is expressed as:

Ia+Ib.

At this time, the wave form converting circuit 20 waveform-converts the modulation signal $S_{RE}$ and generates a control signal $S_A$ to control the open/close of the switch 24. Then, by opening and closing the switch 24 on the basis of this control signal $S_A$, the constant electric current Ia is superimposed onto the constant electric current Ib at the timing based on the control signal $S_A$. In this manner, the wave form conversion is executed on the basis of the modulation signal $S_{RE}$, so that the record signal $S_D$ to form the record pit having a precise shape in correspondence with the digital information signal $S_R$ to be recorded is generated, and is supplied to the laser drive circuit 12.

(III) Wave Form Converting Circuit

Next, the construction and the operation of the wave form converting circuit 20 is explained in detail with reference to FIGS. 3 to 5B.

At first, the construction of the wave form converting circuit 20 is explained with reference to FIG. 3.

Figure 3:
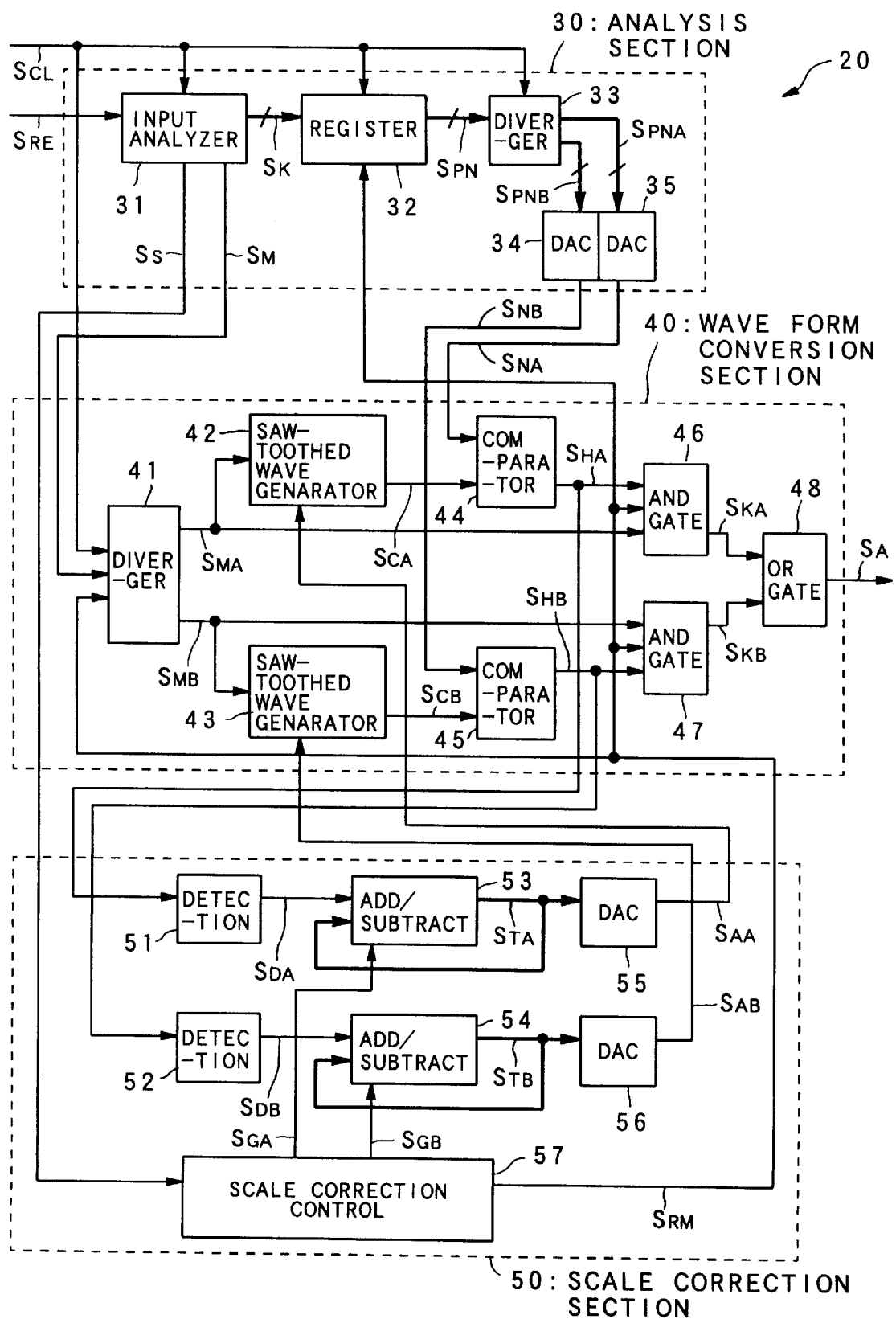
FIG. 3 is a block diagram showing a schematic configuration of a wave form converting circuit of the power control circuit in the embodiment.

In FIG. 3, the wave form converting circuit 20 is provided with: an analysis section 30; a wave form conversion section 40; and a scale correction section 50.

The analysis section 30 is provided with: an input analyzer 31; a register 32; a diverger 33; and D/A converters (DACS) 34 and 35.

The wave form conversion section 40 is provided with: a diverger 41; saw-toothed wave generators 42 and 43; comparators 44 and 45; AND gates (i.e. logical product circuits) 46 and 47; and an OR gate (i.e. a logical sum circuit) 48.

The scale correction section 50 is provided with: detection units 51 and 52; add/subtract units 53 and 54; D/A converters (DACs) 55 and 56; and a scale correction control unit 57.

Next, the operation of each elements is explained with reference to FIGS. 3 and 4. Hereinbelow, the operation of obtaining the control signal $S_A$ to control the switch 24 by wave-form-converting the modulation signal $S_{RE}$, which has a length of 4 T from among various modulation signals $S_{RE}$ based on the digital information signal $S_R$, is explained. Further, in the following explanation, in the first 1.5 T duration of the modulation signal $S_{RE}$ having the length of 4 T, the pulse is deleted (i.e., this portion of the modulation signal $S_{RE}$ is changed to a signal identical with the record signal $S_D$ corresponding to "0" (at the reproduction level)). In the next 1.5 T duration of the modulation signal $S_{RE}$ having the length of 4 T, the modulation signal $S_{RE}$ is left as it is, to be a signal identical with the record signal $S_D$ corresponding to "1" (at the record level). In the next 1 T duration of the modulation signal $S_{RE}$ having the length of 4 T, only the pulse at the first half portion in a length of 0.5 T is deleted, so that the record signal (i.e. the control signal $S_A$) is obtained. Namely, the case is explained where the modulation signal having a length of 11 T as shown in FIG. 8 is converted to the signal having a length of 4 T.

Further, as a presupposition for the operation, a standard clock signal $S_{CL}$ corresponding to the modulation signal $S_{RE}$ is respectively supplied to the input analyzer 31, the register 32 and the diverger 33 in the analysis section 30, and the diverger 41 in the wave form conversion section 40. In the following explanations also, a time duration corresponding to "1" of the modulation signal $S_{RE}$ is defined as a "mark duration", while a time duration corresponding to "0" of the modulation signal $S_{RE}$ is defined as a "space duration" (for example, in case of the modulation signal $S_{RE}$ having the length of 4 T, the mark duration is 4 T).

In the wave form converting circuit 20, at first, when the modulation signal $S_{RE}$ is inputted from the encoder 9, the input analyzer 31 recognizes the wave form (shape) of the modulation signal $S_{RE}$, and outputs a recognition result signal $S_K$ to the register 32. In the present embodiment, the recognition result signal $S_K$ indicating the 4 T mark is outputted to the register 32. On the other hand, along with this, the input analyzer 31 generates the mark signal $S_M$, which is a signal only indicating the mark duration, and a space signal $S_S$, which is a signal only indicating the space duration, on the basis of the modulation signal $S_{RE}$, while delaying them by a time amount required for the wave form recognition in comparison with the modulation signal $S_{RE}$. Then, the input analyzer 31 outputs the mark signal $S_M$ to the diverger 41, and outputs the space signal $S_S$ to the scale correction control unit 57. At this time, the mark signal $S_M$ is identical with the modulation signal $S_{RE}$ itself, which is delayed by a time amount required for the wave form recognition.

Next, the register 32, to which the recognition result signal $S_K$ is inputted, outputs a wave form conversion ratio signal $S_{PN}$ corresponding to the 4 T mark duration from among various wave form conversion ratios, which correspond to 9 different kinds of mark durations (3 T to 11 T) of the modulation signal $S_{RE}$ and which are stored in advance, on the basis of the recognition result signal $S_K$.

Here, the wave form conversion ratios which are stored in advance in the register 32 are explained. In the present embodiment, the wave form conversion ratios are constructed as following. Namely, as for each of the mark durations of the modulation signal $S_{RE}$, the pulse is deleted in the first 1.5 T duration, the signal is left as it is to be "1" in the next 1.5 T duration, and only the first half portion in the 0.5 T duration is deleted in the wave form afterward for each standard clock. More concretely, for example, the wave form conversion ratio (or a wave form deleting ratio in other words) corresponding to the modulation signal $S_{RE}$ having the 4 T mark duration is expressed for each standard clock as following (as shown in FIG. 4).

100%, 50%, 0%, 50%

On the other hand, the wave form conversion ratio corresponding to the modulation signal $S_{RE}$ having the 8 T mark duration is expressed for each standard clock as following.

100%, 50%, 0%, 50%, 50%, 50%, 50%, 50%

The respectively corresponding wave form conversion ratio signal $S_{PN}$ is outputted from the register 32 to the diverger 33.

Figure 4:
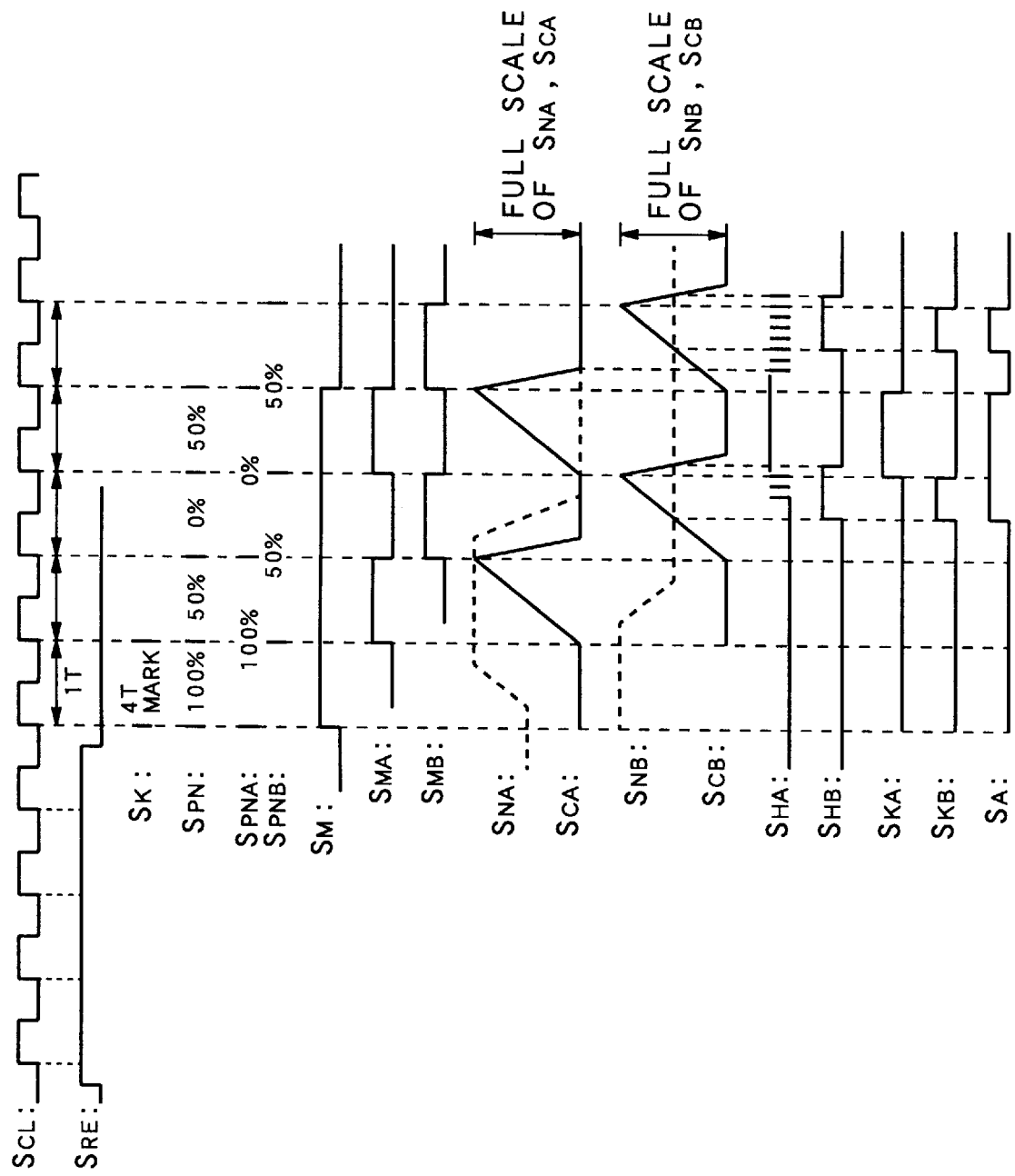
FIG. 4 is a timing chart showing wave forms in main portions of the wave form converting circuit in the embodiment.

Next, the diverger 33 diverges the wave form conversion ratio signal $S_{PN}$ once every two standard clocks as shown in FIG. 4 on the basis of the standard clock signal $S_{CL}$ which is inputted in advance. Thus, the diverger 33 outputs a first wave form conversion ratio signal $S_{PNA}$ and a second wave form conversion ratio signal $S_{PNB}$, each of which changes once every 2 T duration, to the D/A converters 34 and 35 respectively. At this time, the first wave form conversion ratio signal $S_{PNA}$ includes the information as for the wave form conversion ratio corresponding to 100%, 0% during the 4 T duration, while the second wave form conversion ratio signal $S_{PNB}$ includes the information as for the wave form conversion ratio corresponding to 50%, 50% during the 4 T duration (refer to FIG. 4).

Next, the D/A converters 34 and 35 convert these inputted first and second wave form conversion ratio signals $S_{PNA}$ and $S_{PNB}$ to the corresponding analog voltage values respectively, and output them to the comparators 44 and 45 as first and second analog voltage values $S_{NA}$ and $S_{NB}$ respectively.

Here, the D/A converter 35, to which the first wave form conversion ratio signal $S_{PNA}$ is inputted, synchronizes with the timing of the first wave form conversion ratio signal $S_{PNA}$ and outputs the first analog voltage value $S_{NA}$ having the maximum value corresponding to 100% and the first analog voltage value having the zero value corresponding to 0%, as shown in FIG. 4. At this time, the transition from the previous first analog voltage value $S_{NA}$, which corresponds to the timing prior to the mark signal $S_M$, to the first analog voltage value $S_{NA}$ having the maximum value, and the transition from the first analog voltage value $S_{NA}$ having the maximum value to the first analog voltage value $S_{NA}$ having the zero value are performed within 1 T duration respectively as shown in FIG. 4. Thus, a high speed type converter is employed as the D/A converter 35 so as to complete these transitions within the 1 T duration. More concretely, in case of dealing with the 256 analog voltage values, the 8 bits D/A converter, which is used for the television set or the like to convert the video signal, is employed.

On the other hand, the D/A converter 34, to which the second wave form conversion ratio signal $S_{PNB}$ is inputted, synchronizes with the timing of the second wave form conversion ratio signal $S_{PNB}$ and continuously outputs the second analog voltage value $S_{NB}$ having a ½ value of the maximum value corresponding to 50% as shown in FIG. 4. As the D/A converter 34, the 8 bits D/A converter for the video conversion is employed in the same manner as the D/A converter 35.

Next, the operation of the wave form conversion section 40 is explained.

The diverger 41, to which the mark signal $S_M$ from the input analyzer 31 and the standard clock signal $S_{CL}$ are inputted, synchronizes with the standard clock, divides a mark duration of the mark signal $S_M$ once every two standard clocks as shown in FIG. 4, and outputs a first mark signal $S_{MA}$ and a second mark signal $S_{MB}$. At this time, each of the first and second mark signals $S_{MA}$ and $S_{BM}$ is, as shown in FIG. 4, a signal which value repeats "1" and "0" alternatively for each standard clock in correspondence with the duration for the original mark signal $S_M$.

Next, the first mark signal $S_{MA}$ outputted from the diverger 41 is inputted to the saw-toothed wave generator 42 and the AND gate 46 respectively.

Among these, the saw-toothed wave generator 42 generates a first saw-toothed signal $S_{CA}$ having a saw-toothed wave form, which rises up in synchronization with the rising up of the first mark signal $S_{MA}$, and which becomes the maximum and starts to fall down in synchronization with the falling down of the fist mark signal $S_{MA}$, on the basis of the inputted first mark signal $S_{MA}$, and outputs it to the comparator 44.

Then, the comparator 44 compares the above mentioned first analog voltage value $S_{NA}$ and the first saw-toothed signal $S_{CA}$ with each other as shown in FIG. 4, and outputs a first comparison signal $S_{HA}$. At this time, a full scale (i.e. a dynamic range) of the first analog voltage value $S_{NA}$ and a full scale (i.e. a dynamic range) of the first saw-toothed signal $S_{CA}$ are set to be coincident to each other by an operation of the scale correction section 50 described later in detail during the space duration of the modulation signal $S_{RE}$.

As for the wave form of the first comparison signal $S_{HA}$, as shown in FIG. 4, the first comparison signal $S_{HA}$ corresponding to "0" is outputted at the timing corresponding to the first analog voltage value $S_{NA}$ at the maximum value. The first comparison signal $S_{HA}$ corresponding to "1" is outputted at the timing corresponding to the first analog voltage value $S_{NA}$ at the zero value. Incidentally, in FIG. 4, as for the first comparison signal $S_{HA}$ at the timing corresponding to the first analog voltage value $S_{NA}$ at the zero value, each of the rising up duration and the falling down duration thereof is an indefinite duration. This is because, since the first saw-toothed wave signal $S_{CA}$ at the zero value and the first analog voltage value $S_{NA}$ at the zero value are compared with each other by the comparator 44 at the timing corresponding to the first analog voltage value $S_{NA}$ at the zero value, the first comparison signal $S_{HA}$ as the comparison result is fluctuated due to the noise etc., while both of these values are zero.

Next, the first comparison signal $S_{HA}$ is inputted to the AND gate 46 together with the first mark signal $S_{MA}$. Then, the logical product of these inputted signals is calculated, and is outputted as a first logical product signal $S_{KA}$. At this time, since the first logical product signal $S_{KA}$ is the logical product i.e. the AND of the first comparison signal $S_{HA}$ and the first mark signal $S_{MA}$, the indefinite duration is dissolved as shown in FIG. 4, so that the first logical product signal $S_{KA}$ becomes a signal in a pulse wave form having the length corresponding to the pulse deleting ratio (100%, 0%) with respect to the first mark signal $S_{MA}$.

On the other hand, the second mark signal $S_{MB}$ outputted from the diverger 41 is inputted to the saw-toothed wave generator 43 and the AND gate 47 respectively.

The saw-toothed wave generator 43 generates a second saw-toothed signal $S_{CB}$ having a saw-toothed wave from, which rises up in synchronization with the rising up of the second mark signal $S_{MB}$, and which becomes the maximum and starts to fall down in synchronization with the falling down of the second mark signal $S_{MB}$, on the basis of the inputted second mark signal $S_{MB}$, and outputs it to the comparator 45.

Then, the comparator 45 compares the above mentioned second analog voltage value $S_{NB}$ and the second saw-toothed signal $S_{CB}$ with each other as shown in FIG. 4, and outputs a second comparison signal $S_{HB}$. At this time, the full scale of the second analog voltage value $S_{NB}$ and the full scale of the second saw-toothed signal $S_{CB}$ are set to be coincident to each other by the operation of the scale correction section 50 described later.

The second comparison signal $S_{HB}$ is, as shown in FIG. 4, in such a wave form corresponding to "1" only during the time duration corresponding to about ½ of 1 T duration, at the timing corresponding to the second analog voltage value $S_{NB}$ having the ½ value of the maximum value. Incidentally, in FIG. 4, in case of the second comparison signal $S_{HB}$, since there is no time duration in which the zero values are compared with each other as in the case of the first comparison signal $S_{HA}$, the indefinite duration as in the case of the first comparison signal $S_{HA}$ is not generated.

Next, the second comparison signal $S_{HB}$ is inputted to the AND gate 47 together with the second mark signal $S_{MB}$. Then, the logical product of these inputted signals is calculated, and is outputted as a second logical product signal $S_{KB}$. At this time, since the second logical product signal $S_{KB}$ is the logical product i.e. the AND of the second comparison signal $S_{HB}$ and the second mark signal $S_{NB}$, the second logical product signal $S_{KB}$ becomes a signal having a pulse wave form in the length corresponding to the pulse deleting ratio (50%, 50%) for the second mark signal $S_{MB}$, as shown in FIG. 4.

Next, the first and second logical product signals $S_{KA}$ and $S_{KB}$ are inputted to the OR gate 48 (i.e. the logical sum circuit), and the logical sum thereof is calculated. Then, with respect to the modulation signal $S_{RE}$ having the mark duration of 4 T, the control signal $S_A$ is outputted in which the pulse in the first 1.5 T duration is deleted, the pulse in the next 1.5 T duration is left as it is, and the pulse during the next 1 T is deleted only by 50%. Then, the constant electric currents Ia and Ib are selectively superimposed by the switch 24 which is opened/closed by the control signal $S_A$, so that the drive signal $S_D$ which ON/OFF is switched over at the timing same as the control signal $S_A$ is outputted in FIG. 2.

After that, the laser drive signal $S_{DL}$ is generated on the basis of the drive signal $S_D$, and the record pit is formed as the laser beam B is turned ON/OFF at the timing same as the control signal $S_A$. By this, as compared with the case where the laser drive signal $S_{DL}$ is generated directly by the modulation signal $S_{RE}$ as in the aforementioned related art, the precise record pit can be formed in correspondence with the modulation signal $S_{RE}$ since the pulse wave form is partially deleted.

Next, the operation of the scale correction section 50 during the space duration of the modulation signal $S_{RE}$ is explained with reference to FIG. 3.

In FIG. 3, during the space duration of the modulation signal $S_{RE}$, when the space signal $S_S$ corresponding to this space duration is inputted to the scale correction control unit 57, the scale correction control unit 57 outputs a pseudo mark signal $S_{RM}$ corresponding to the mark signal $S_M$. Then, the pseudo mark signal $S_{RM}$ is inputted through the diverger 41 to the saw-toothed wave generators 42 and 43 simultaneously, so that a saw-toothed wave signal which has the same rising up gradient and the maximum value as the first and second saw-toothed wave signals $S_{CA}$ and $S_{CB}$ respectively is generated, On the other hand, the pseudo mark signal $S_{RM}$ is also outputted to the AND gates 46 and 47 respectively, and controls the AND gates 46 and 47 not to output the signal during the pertinent space duration i.e. the correction duration for the full scale respectively Further, the pseudo mark signal $S_{RM}$ is also outputted to the register 32, and controls the register 32 to output the wave form conversion ratio signal $S_{PN}$ having the deleting ratio corresponding to 100%. Then, the diverger 33 and the D/A converters 34 and 35 perform the operation same as the above with respect to the wave form conversion ratio signal $S_{PN}$ on the basis of the pseudo mark signal $S_{RM}$, so as to output the first and second analog voltage values $S_{NA}$ and $S_{NB}$ at the maximum values respectively corresponding to 100%.

On the other hand, the detection units 51 and 52 monitors the comparators 44 and 45 respectively during the time duration in which the pseudo mark signal $S_{RM}$ is outputted, and detects whether or not the first and second comparison signals $S_{HA}$ and $S_{HB}$ are outputted respectively.

At this time, since (i) the first analog voltage value $S_{NA}$ corresponding to 100% and (ii) the saw-toothed wave signal, which has the rising up gradient and the maximum value same as those of the first saw-toothed signal $S_{CA}$, are inputted to the comparator 44, if the first comparison signal $S_{HA}$ is outputted from the comparator 44 in this condition, the peak value of the saw-toothed wave signal at the moment is supposed to be higher than the first analog voltage value $S_{NA}$ at the maximum value. On the contrary, if the first comparison signal $S_{HA}$ is outputted from the comparator 44, the peak value of the saw-toothed wave signal at the moment is supposed to be lower than the first analog voltage value $S_{NA}$ at the maximum value.

Therefore, the add/subtract unit 53, which has recognized the existence of the output from the comparator 44 by the detection signal $S_{DA}$ from the detector 51, decreases the value of an add/subtract output $S_{TA}$ by applying a feed-back onto the immediately previous add/subtract output $S_{TA}$, on the basis of a control signal $S_{GA}$ from the scale correction control unit 57. Then, the decreased add/subtract output $S_{TA}$ is converted to an analog signal $S_{AA}$ by the D/A converter 55, and is inputted to the saw-toothed wave generator 42. Then, the peak value of the saw-toothed wave signal having the rising up gradient and the maximum value same as those of the first saw-toothed signal $S_{CA}$ is decreased. By this, since the rising up gradient and the peak value of the first saw-toothed signal $S_{CA}$ are decreased, the full scale of the first saw-toothed signal $S_{CA}$ and the full scale of the first analog voltage value $S_{NA}$ are made coincident to each other.

On the other hand, in case that no output is outputted from the comparator 44, the add/subtract unit 53, which has recognized the non-existence of the output by the detection signal $S_{DA}$ from the detector 51, increases the value of the add/subtract output $S_{TA}$ by applying a feed-back onto the immediately previous add/subtract output $S_{TA}$. Then, the increased add/subtract output $S_{TA}$ is converted to the analog signal $S_{AA}$ by the D/A converter 55, and is inputted to the saw-toothed wave generator 42. Then, the peak value of the saw-toothed wave signal, which is being outputted at the moment, is increased. By this, since the rising up gradient and the peak value of the first saw-toothed signal $S_{CA}$ are increased, the full scale of the first saw-toothed signal $S_{CA}$ and the full scale of the first analog voltage value $S_{NA}$ are made coincident to each other.

By virtue of the detection unit 51, the add/subtract unit 53 and the D/A converter 55, by repeating the correction operation for the maximum value with respect to the saw-toothed wave signal, which has the rising up gradient and the maximum value same as those of the first saw-toothed signal $S_{CA}$ as described above, during the space duration of the modulation signal $S_{RE}$, the peak value of the first saw-toothed signal $S_{CA}$ and the first analog voltage value $S_{NA}$ at the maximum value corresponding to 100% are made coincident to each other. Thus, the full scale of the first saw-toothed signal $S_{CA}$ and the full scale of the first analog voltage value $S_{NA}$ are automatically made coincident to each other.

As for the saw-toothed wave generator 43, by virtue of the detection unit 52, the add/subtract unit and 54 and the D/A converter 56, by repeating the correction operation for the maximum value with respect to the saw-toothed wave signal, which has the rising up gradient and the maximum value same as those of the second saw-toothed signal $S_{CB}$ as described above, during the space duration of the modulation signal $S_{RE}$, the peak value of the second saw-toothed signal $S_{CB}$ and the second analog voltage value $S_{NB}$ at the maximum value corresponding to 100% are made coincident to each other. Thus, the full scale of the second saw-toothed signal $S_{CB}$ and the full scale of the second analog voltage value $S_{NB}$ are automatically made coincident to each other.

Incidentally, the add/subtract units 53 and 54 and the D/A converters 55 and 56, each of which has the resolution about same as that of the D/A converter 34 or 35, may be employed.

Further, as concrete constructions of the input analyzer 31, the register 32 and the diverger 33 in the analysis section 30, the diverger 41 and the saw-toothed wave generators 42 and 43 in the wave form conversion section 40, various constructions may be available as long as they operate in the above described manner. Some examples of such concrete constructions are explained here with reference to FIGS. 5A to 6B.

Figure 5A:
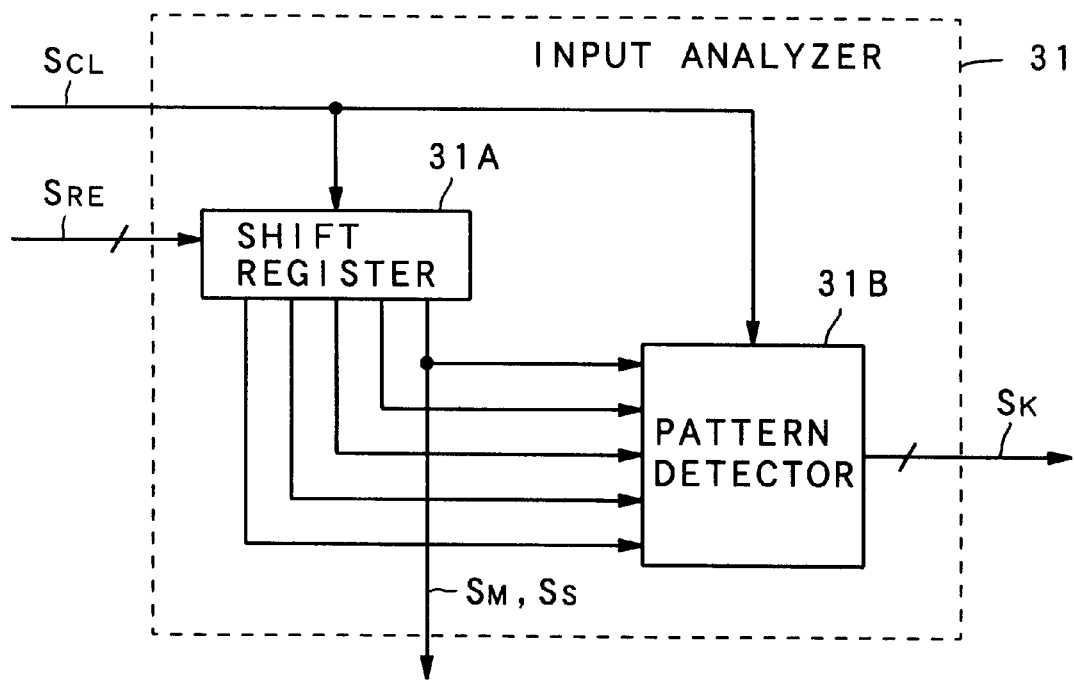
FIG. 5A is a block diagram showing a schematic configuration of an input analyzer in an analysis section of the wave form converting circuit in the embodiment.

Namely, FIG. 5A shows an example of a concrete construction of the input analyzer 31.

In FIG. 5A, the input analyzer 31 is provided with: a shift register 31A for temporarily storing the modulation signal $S_{RE}$ and outputting one portion of the stored modulation signal $S_{RE}$ as the mark signal $S_M$ on the basis of the standard clock signal $S_{CL}$; and a pattern detector 31B for detecting (recognizing) the pattern of the wave shape during the mark duration of the modulation signal $S_{RE}$ on the basis of each of the output signals from the shift register 31A, and outputting the recognition result signal $S_K$.

Figure 5B:
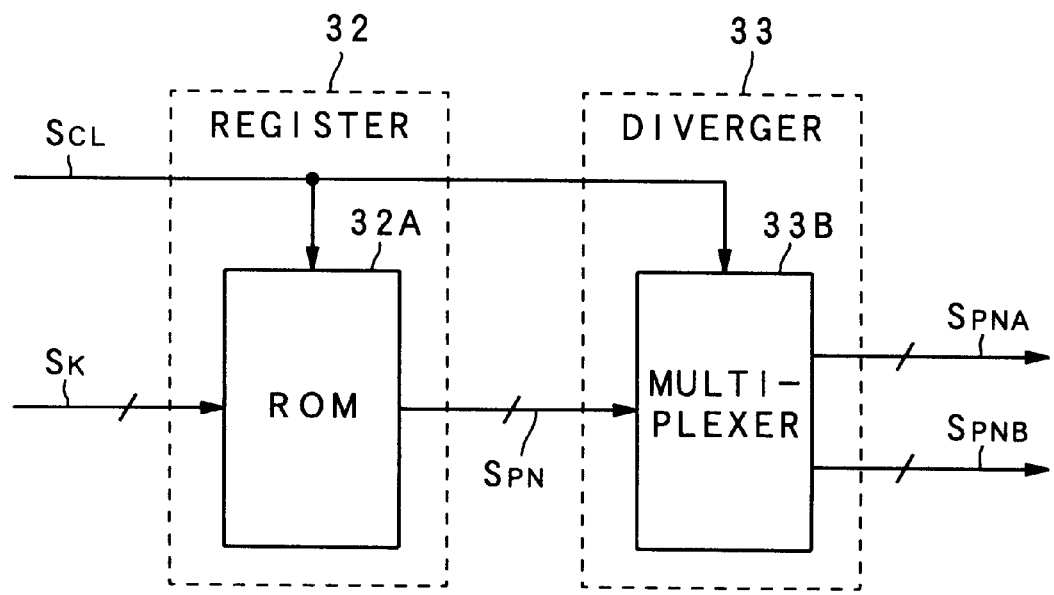
FIG. 5B is a block diagram showing a schematic configuration of a register and a diverger in the analysis section of the wave form converting circuit in the embodiment.

FIG. 5B shows an example of a concrete construction of the register 32 and the diverger 33.

In FIG. 5B, the register 32 is constructed by a ROM (Read Only Memory) 32A for storing the wave form conversion ratios (i.e. the pulse deleting ratios) corresponding to the respective mark durations (3 T to 11 T) of the modulation signal $S_{RE}$ in advance, and outputting one of them as the wave form conversion ratio signal $S_{PN}$ on the basis of the recognition result signal $S_K$ and the standard clock signal $S_{CL}$. The diverger 33 is constructed by a multiplexer 33B for separating the wave form conversion ratio signal $S_{PN}$ for each clock on the basis of the standard clock signal $S_{CL}$, and outputting the separated signals as the first and second wave form conversion ratio signals $S_{PNA}$ and $S_{PNB}$ to the D/A converters 34 and 35 respectively.

Figure 6A:
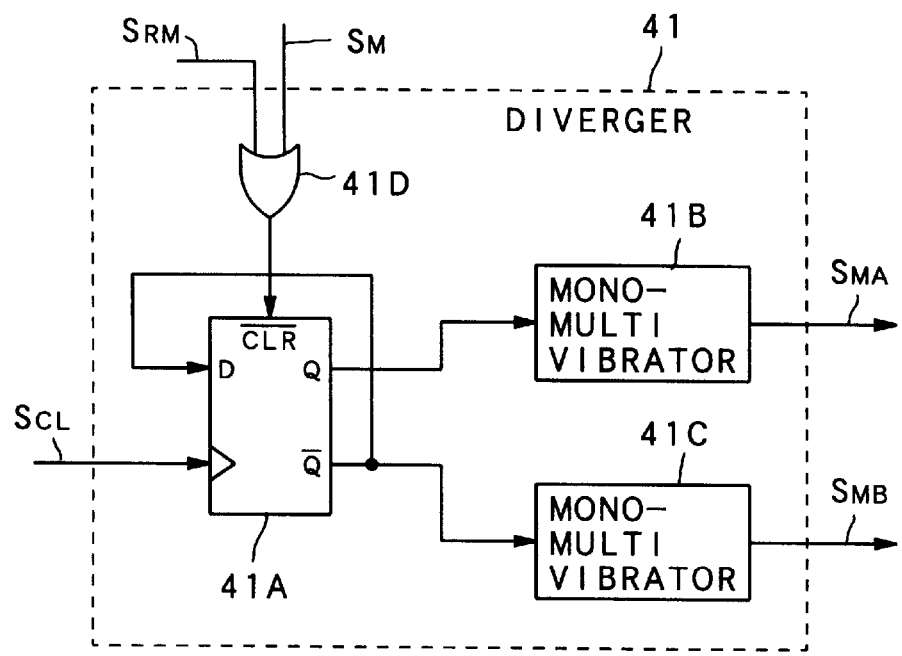
FIG. 6A is a block diagram showing a schematic configuration of a diverger in a wave form conversion section of the wave form converting circuit in the embodiment.

Further, FIG. 6A shows an example of a concrete construction of the diverger 41.

In FIG. 6A, the diverger 41 is provided with: an OR gate (a logical sum circuit) 41D for calculating a logical sum of the mark signal $S_M$ and the pseudo mark signal $S_{RM}$, and outputting either one of them; a flip-flop circuit 41A for using the output of the OR gate 41D as the initialization signal, functioning as a bistable multi-vibrator on the basis of the initialization signal and the standard clock signal $S_{CL}$ and outputting an output signal and an inverted output signal; a mono-multi vibrator 41B for outputting the first mark signal $S_{MA}$ on the basis of the output signal of the flip-flop circuit 41A; and a mono-multi vibrator 41C for outputting the second mark signal $S_{MB}$ on the basis of the inverted output signal of the flip-flop circuit 41A.

Figure 6B:
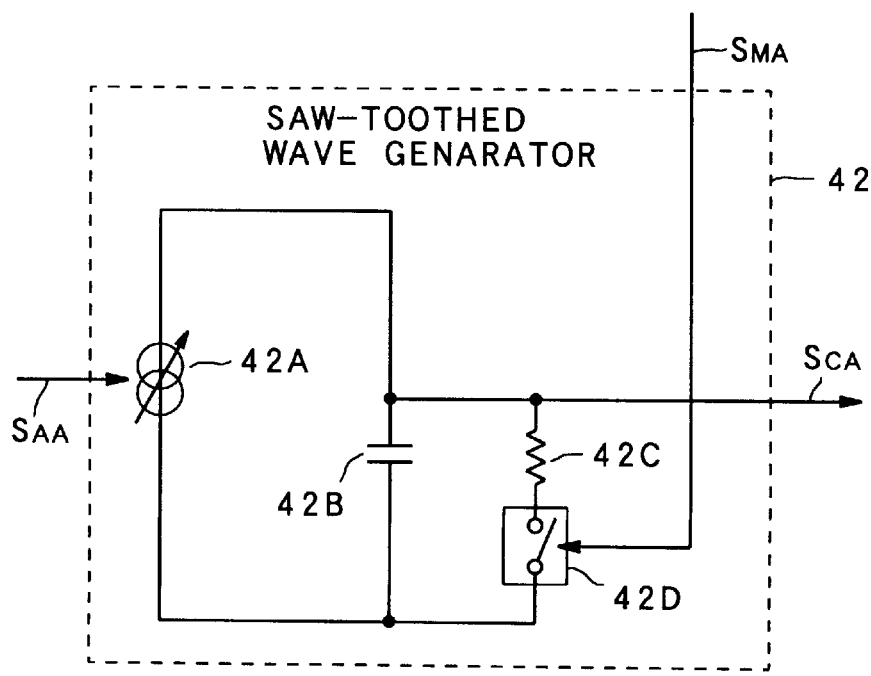
FIG. 6B is a block diagram showing a schematic configuration of a saw-toothed wave generator in the wave form conversion section of the wave form converting circuit in the embodiment.
Figure 7:
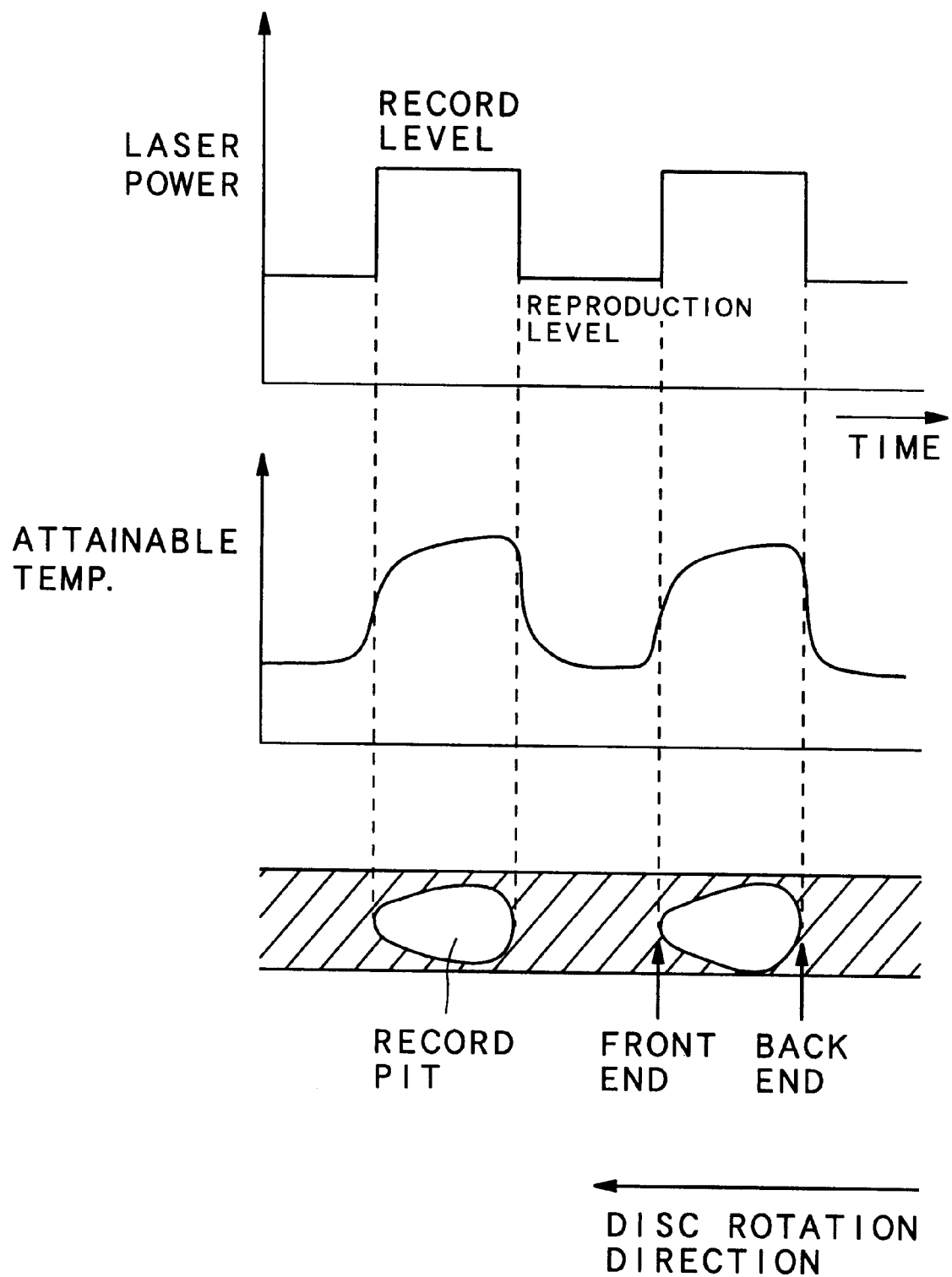
FIG. 7 is a diagram showing a problem in the related art, in which (i) a time change of a record laser power (at a top stage), (ii) a position change of an attainable temperature in a pigment film along a record track (at a middle stage) and (iii) a plan view showing a shape of a record pit along the record track (at a bottom stage) are related to each other.

Finally, FIG. 6B shows an example of a concrete construction of the saw-toothed wave generator 42.

In FIG. 6B, the saw-toothed wave generator 42 is provided with: a variable electric current source 42A, the output electric current value of which is controlled on the basis of the analog signal $S_{AA}$ from the D/A converter 55; a capacitor 42B and a resistor 42C for setting the time constant to determine the rising up gradient of the first saw-toothed signal $S_{CA}$ to be outputted; and a switch 42D which open/close condition is controlled by the first mark signal $S_{MA}$. At this time, the switch 42D is controlled to operate such that it opens during the time period of "H" (corresponding to "1") of the first mark signal $S_{MA}$ and closes during the time period of "L" (corresponding to "0") of the first mark signal $S_{MA}$. The construction and the operation of the saw-toothed wave generator 43 may be same as those of the saw-toothed wave generator 42.

As described above in detail, according to the wave form converting circuit 20 of the present embodiment, the wave form of the modulation signal $S_{RE}$ is pattern-recognized, then, the first analog voltage value $S_{NA}$ (or the second analog voltage value $S_{NB}$), which is based on the wave form conversion ratio corresponding to the pattern-recognized wave form, and the level of the first saw-toothed signal $S_{CA}$ (or the level of the second saw-toothed signal $S_{CB}$) are compared with each other for each standard clock, and then, the first logical product signal $S_{KA}$ (or the second logical product signal $S_{KB}$) is outputted on the basis of the comparison result. Thus, if the D/A converters 34 and 35 are constituted of the 8 bits converters, for example, it is possible to separate the first or second analog voltage value $S_{NA}$ or $S_{NB}$ into 256 different values in correspondence with the wave form conversion ratio. By this, the pulse wave form of the digital information signal $S_R$ can be converted to the record signal $S_D$ finely for each standard clock (i.e., in 256 different values), so that the digital information signal SR can be converted to the record signal $S_D$ with a high accuracy and a high repeatability.

Therefore, it is possible to economically and easily produce the digital information recording apparatus S, which is capable of converting the digital information signal $S_R$ accurately to the record signal $S_D$ and recording it onto the DVD-R 1, by employing the existing inexpensive elements without employing a very high speed and high accuracy element such as an ECL circuit or the like.

By the scale correction section 50, the maximum value of the first or second analog voltage value $S_{NA}$ or $S_{NB}$ and the maximum value of the first or second saw-toothed signal $S_{CA}$ or $S_{CB}$ are made coincident to each other. Thus, the full scale of the first or second analog voltage value $S_{NA}$ or $S_{NB}$ and the full scale of the first or second saw-toothed signal $S_{CA}$ or $S_{CB}$ are made coincident to each other, and then are compared with each other. Accordingly, it is possible to output the highly accurate first or second comparison signal $S_{HA}$ or $S_{HB}$, which precisely corresponds to the wave form conversion ratio. Therefore, it is possible to record the highly accurate and precise digital information signal $S_R$.

Further, when the scale correction section 50 performs the correction to make the maximum value of the first or second analog voltage value $S_{NA}$ or $S_{NB}$ and the maximum value of the first or second saw-toothed signal $S_{CA}$ or $S_{CB}$ coincident to each other, the scale correction section 50 controls the wave form conversion section 40 to stop outputting the first or second logical product signal $S_{KA}$ or $S_{KB}$ while performing this correction. Thus, the correction can be performed while preventing the wave form due to the correction from harmfully influencing the record signal $S_D$.

Furthermore, since the conversion from the digital information signal $S_R$ to the record signal $S_D$ is performed such that the digital information signal $S_R$ is separated once every two standard clocks, it is possible to secure the rising up time of the first or second saw-toothed signal $S_{CA}$ or $S_{CB}$ or the like with an enough margin, and it is possible to secure the conversion time for converting the first or second wave form conversion ratio signal $S_{PNA}$ or $S_{PNB}$ to the first or second analog voltage value $S_{NA}$ or $S_{NB}$, so that the conversion to the record signal $S_D$ can be performed more accurately.

Further, the wave form conversion ratios stored in the register 32 are set such that the pulse in the first 1.5 T duration of the wave form during the mark duration is deleted, the wave form is left as it is in the next 1.5 T duration, and that the deleting ratio is set to 50% in the next 1 T duration. Thus, it is possible to form the record pits, which precisely correspond to the digital information signal $S_R$ and which have the precise shapes, on the DVD-R 1.

Incidentally, in the above explained embodiment, the register 32 is constructed by the ROM 32A which stores the respective wave form conversion ratios in advance. However, the present invention is not limited to this. For example, the register 32 may be constructed by an EPROM (Erasable and Programmable ROM), a RAM (Random Access Memory) or the like, into which the wave form conversion ratios can be stored in operation, such that the stored wave form conversion ratios can be changed to the optimum values in dependence on the kinds of the information record medium, under the control of the processor 8.

Further, the scale correction section 50 in the above described embodiment is constructed such that the full scale of the first or second analog voltage value $S_{NA}$ or $S_{NB}$ and the full scale of the first or second saw-toothed signal $S_{CA}$ or $S_{CB}$ are made coincident to each other by making the maximum value of the first or second analog voltage value $S_{NA}$ or $S_{NB}$ and the maximum value of the first or second saw-toothed signal $S_{CA}$ or $S_{CB}$ coincident to each other. However, the present invention is not limited to this. For example, not only the maximum value but also the minimum value of the first or second analog voltage value $S_{NA}$ or $S_{NB}$ and the minimum value of the first or second saw-toothed signal $S_{CA}$ or $S_{CB}$ may be made coincident to each other, so that the full scale of the first or second analog voltage value $S_{NA}$ or $S_{NB}$ and the full scale of the first or second saw-toothed signal $S_{CA}$ or $S_{CB}$ are made coincident to each other.

As for the correction to make the full scale of the first or second analog voltage value $S_{NA}$ or $S_{NB}$ and the full scale of the first or second saw-toothed signal $S_{CA}$ or $S_{CB}$ coincident to each other, the amplitude of the first or second saw-toothed signal $S_{CA}$ or $S_{CB}$ is changed so as to perform the correction. However, the present invention is not limited to this. For example, by changing the proportional constant for use in converting the first or second wave form conversion ratio signal $S_{PNA}$ or $S_{PNB}$ to the first or second analog voltage value $S_{NA}$ or $S_{NB}$, the full scale of the first or second analog voltage value $S_{NA}$ or $S_{NB}$ may be changed. Namely, as long as the full scales can be made mutually coincident to each other between the first or second analog voltage value $S_{NA}$ or $S_{NB}$ and the first or second saw-toothed signal $S_{CA}$ or $S_{CB}$, the full scale of either signal may be changed.

In the above explained embodiment, the case where the digital information signal $S_R$ is recorded onto the DVD-R 1 has been explained. However, the present invention is not limited to this. For example, as long as the digital information is to be recorded, the present invention can be applied to a hard disc apparatus, a flexible disc apparatus and so on. Further, the present invention can be also applied to a so-called DVD-RAM, on which the recording or writing operation can be performed many times.

Here, in order to investigate the advantage of the present embodiment as for the simple and economical structure thereof, some comparison examples are explained.

Figure 9A:
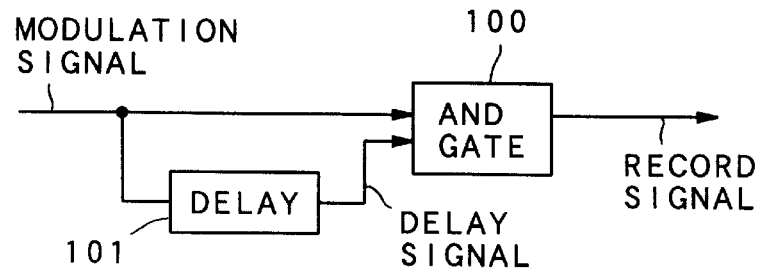
FIG. 9A is a block diagram showing a first comparison example of a wave form conversion circuit equipped with a delay circuit.
Figure 9B:
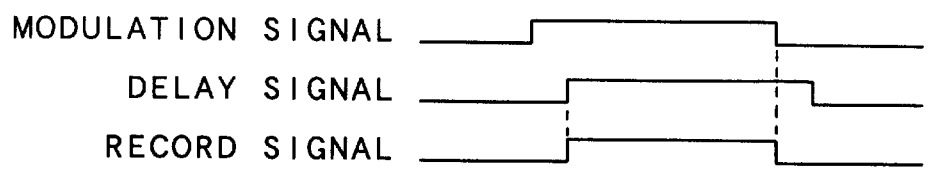
FIG. 9B is a timing chart showing an operation of the wave form conversion circuit of FIG. 9A.

FIG. 9A shows a first comparison example of a wave form conversion circuit equipped with a delay circuit to wave-form-convert the modulation signal shown in the top stage of FIG. 8 to the record signal shown in the bottom stage of FIG. 8. FIG. 9B shows a modulation signal to be wave-form-converted (at a top stage), a delay signal obtained by delaying the modulation signal (at a middle stage) and a record signal obtained as a result of the wave form conversion (at a bottom stage). In FIG. 9A, the first portion of the modulation signal is erased by an amount of 1.5 T, for example, by calculating a logical product of (i) the delay signal, which is generated by delaying the modulation signal by a delay circuit 101 by an amount of 1.5 T, and (ii) an original wave form of the modulation signal by an AND gate circuit 100 (as a logical product circuit).

Figure 10A:
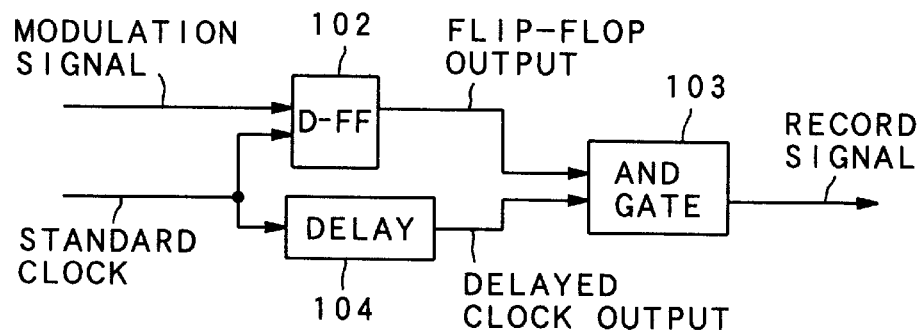
FIG. 10A is a block diagram showing a second comparison example of a wave form conversion circuit equipped with a delay circuit.
Figure 10B:
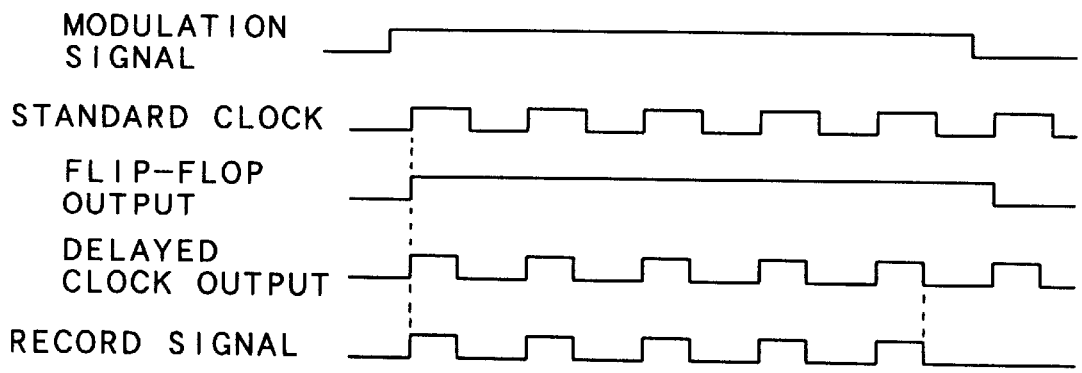
FIG. 10B is a timing chart showing an operation of the wave form conversion circuit of FIG. 10A.

FIG. 10A shows a second comparison example of a wave form conversion circuit equipped with a delay circuit to wave-form-convert the modulation signal shown in the top stage of FIG. 8 to the record signal shown in the bottom stage of FIG. 8. FIG. 10B shows a modulation signal to be wave-form-converted (at a top stage), a standard clock signal (at a second top stage), a flip-flop output (at a middle stage), a delayed clock output obtained by delaying the standard clock signal(at a second bottom stage), and a record signal obtained as a result of the wave form conversion (at a bottom stage). In FIG. 10A, the latter half portion of the modulation signal is converted to the wave form, in which the short pulses are continuously arranged in time sequence, by (1) operating a flip-flop circuit (D-FF) 102 by use of the standard clock as a trigger on the basis of the modulation signal, and (2) calculating the logical product of (i) the output of the flip-flop circuit 102 and (ii) the delayed clock signal, which is obtained by delaying the standard clock for a predetermined delay time period by a delay circuit 104, by an AND gate circuit 103 (as a logical product circuit).

In this manner, the delay circuit 101 in FIG. 9A or the delay circuit 104 in FIG. 10A is required in either of the first and second comparison examples.

As clearly understood from the comparison examples explained with reference to FIGS. 9A to 10B, the present embodiment is superior in its simple and economical hardware structure to record the digital information precisely while maintaining the resolution, the accuracy and the repeatability at levels suitable for the DVD-R.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A digital information recording apparatus comprising:
   a wave form recognizing device for recognizing a type of a pulse wave form of digital information, which is to be recorded onto an information record medium;
   a conversion ratio memory device for storing a plurality of wave form conversion ratios, which are set in advance for each of standard clocks of the digital information and which correspond to a plurality of types of pulse wave forms of the digital information, and outputting one of the stored wave form conversion ratios which corresponds to the recognized type of the pulse wave form;
   a voltage converting device for converting the outputted wave form conversion ratio to an analog voltage value;
   a generating device for generating a saw-toothed signal which has a saw-toothed wave form for each of the standard clocks;
   a comparing device for comparing the converted analog voltage value with a value of the saw-toothed wave form of the generated saw-toothed signal, and outputting a digital comparison signal, which value is one of "1" and "0" when the value of the saw-toothed wave form is larger than the converted analog voltage value and which value is the other of "1" and "0" when the value of the saw-toothed wave form is not larger than the converted analog voltage value;
   a calculating device for calculating a logical product of the outputted digital comparison signal and the digital information for each of the standard clocks, and outputting a logical product signal indicating the calculated logical product; and
   a recording device for recording the outputted logical product signal as a record signal corresponding to the digital information onto said information record medium.

2. A digital information recording apparatus according to claim 1, further comprising a scale correcting device for correcting at least one of the converted analog voltage value and the value of the saw-toothed wave form so as to make a maximum value of the converted analog voltage value and a maximum value of the saw-toothed wave form coincident to each other,
   said comparing device comparing the converted analog voltage value with the value of the saw-toothed wave form in a condition where the maximum value of the converted analog voltage value and the maximum value of the saw-toothed wave form are coincident to each other.

3. A digital information recording apparatus according to claim 2, wherein
   said scale correcting device corrects at least one of the converted analog voltage value and the value of the saw-toothed wave form during a space time duration in which space information corresponding to "0" of the digital information is inputted to said digital information recording apparatus, and
   said scale correcting device controls said calculating device to stop outputting the logical product signal while said scale correcting device is correcting during the space time duration.

4. A digital information recording apparatus according to claim 1, wherein:
   said voltage converting device converts the wave form conversion ratio corresponding to an odd standard clock among the standard clocks and the wave form conversion ratio corresponding to an even standard clock among the standard clocks separately from each other to an odd analog voltage value and an even analog voltage value respectively;
   said generating device generates an odd saw-toothed signal which has an odd saw-toothed wave form for the odd standard clock and an even saw-toothed signal which has an even saw-toothed wave form for the even standard clock separately from each other;

said comparing device compares the converted odd analog voltage value with a value of the odd saw-toothed wave form, outputs an odd digital comparison signal as one portion of the digital comparison signal corresponding to the odd standard clock, compares the converted even analog voltage value with a value of the even saw-toothed wave form, and outputs an even digital comparison signal as another portion of the digital comparison signal corresponding to the even standard clock;

said calculating device calculates an odd logical product of the outputted odd digital comparison signal and the digital information corresponding to the odd standard clock, outputs an odd logical product signal indicating the calculated odd logical product, calculates an even logical product of the outputted even digital comparison signal and the digital information corresponding to the even standard clock, and outputs an even logical product signal indicating the calculated even logical product; and said recording device generates a logical sum signal corresponding to a logical sum of the outputted odd logical product signal and the outputted even logical product signal, and records the generated logical sum signal as the record signal onto said information record medium.

5. A digital information recording apparatus according to claim 1, wherein, when mark information corresponding to "1" of the digital information is inputted to said digital information recording apparatus, said conversion ratio memory device outputs the wave form conversion ratio so that a pulse in the record signal is not outputted during a first time duration corresponding to a first standard clock in the mark information, outputs the wave form conversion ratio so that a pulse in the record signal is outputted during a half of a second time duration corresponding to a second standard clock in the mark information, and outputs the wave form conversion ratio so that a pulse in the record signal is continuously outputted during a third time duration corresponding to a third standard clock in the mark information.

6. A digital information recording apparatus according to claim 1, wherein said voltage converting device comprises an 8 bits digital-to-analog converter.

* * * * *